V. G. ANDERSON.
WALKING MOTION PROPELLING APPARATUS.
APPLICATION FILED APR. 22, 1918.
1,429,551.
Patented Sept. 19, 1922.
7 SHEETS—SHEET 1.
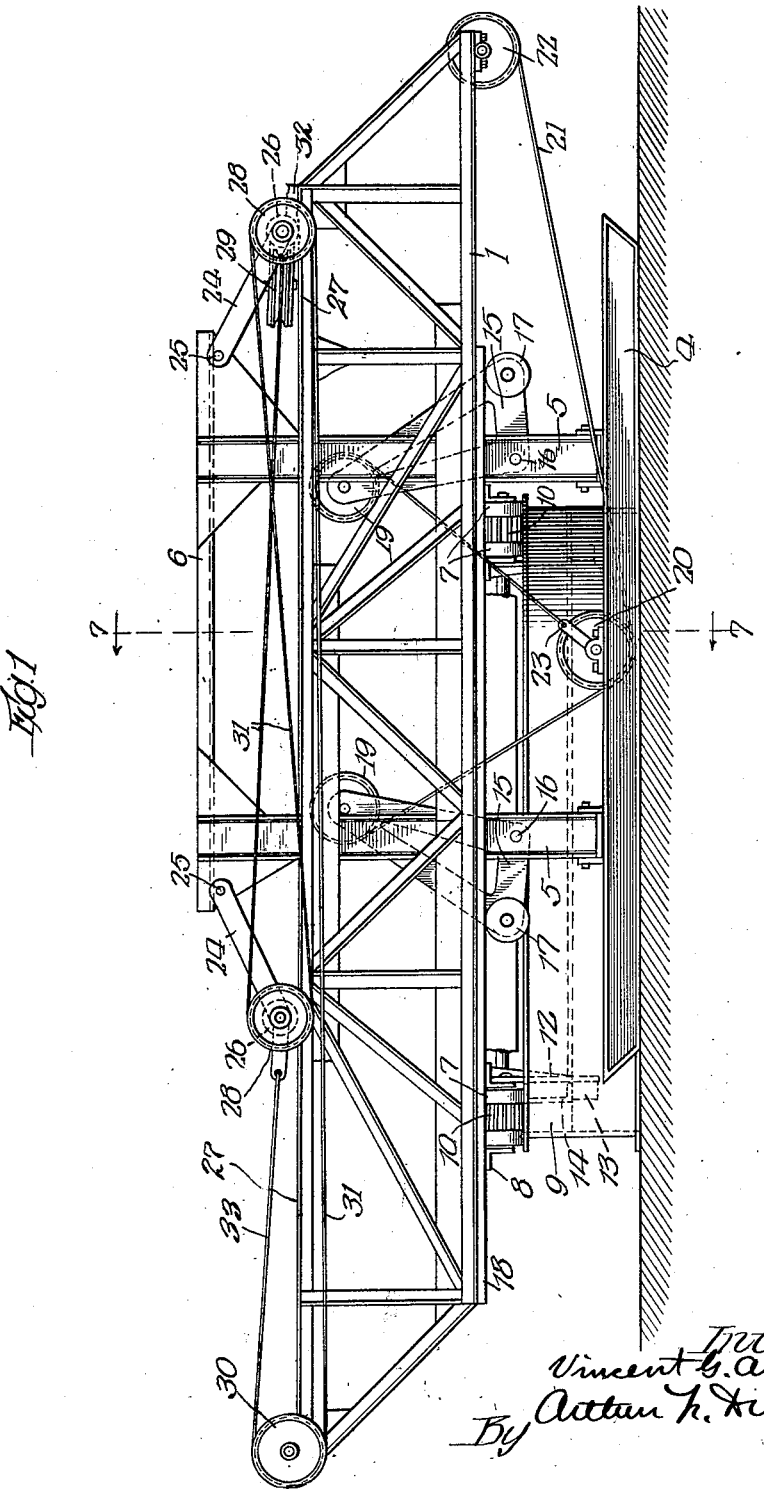

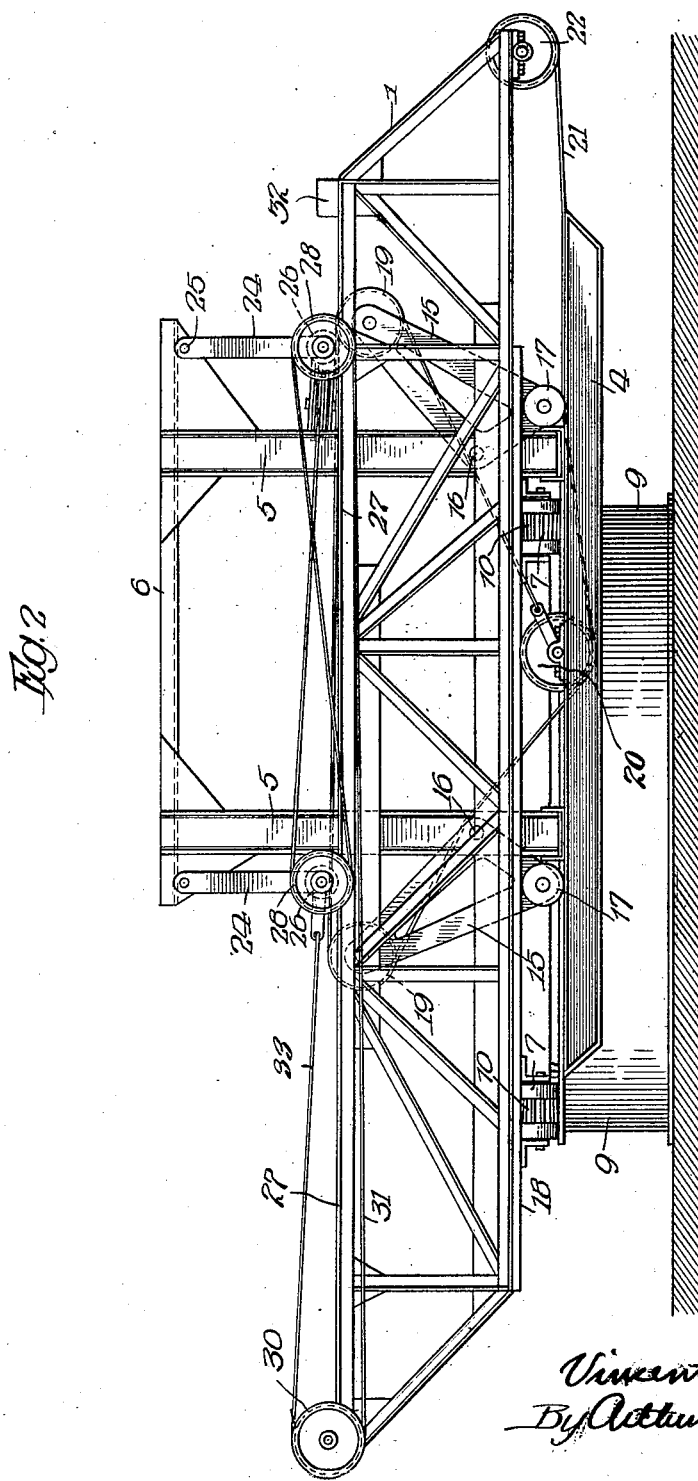

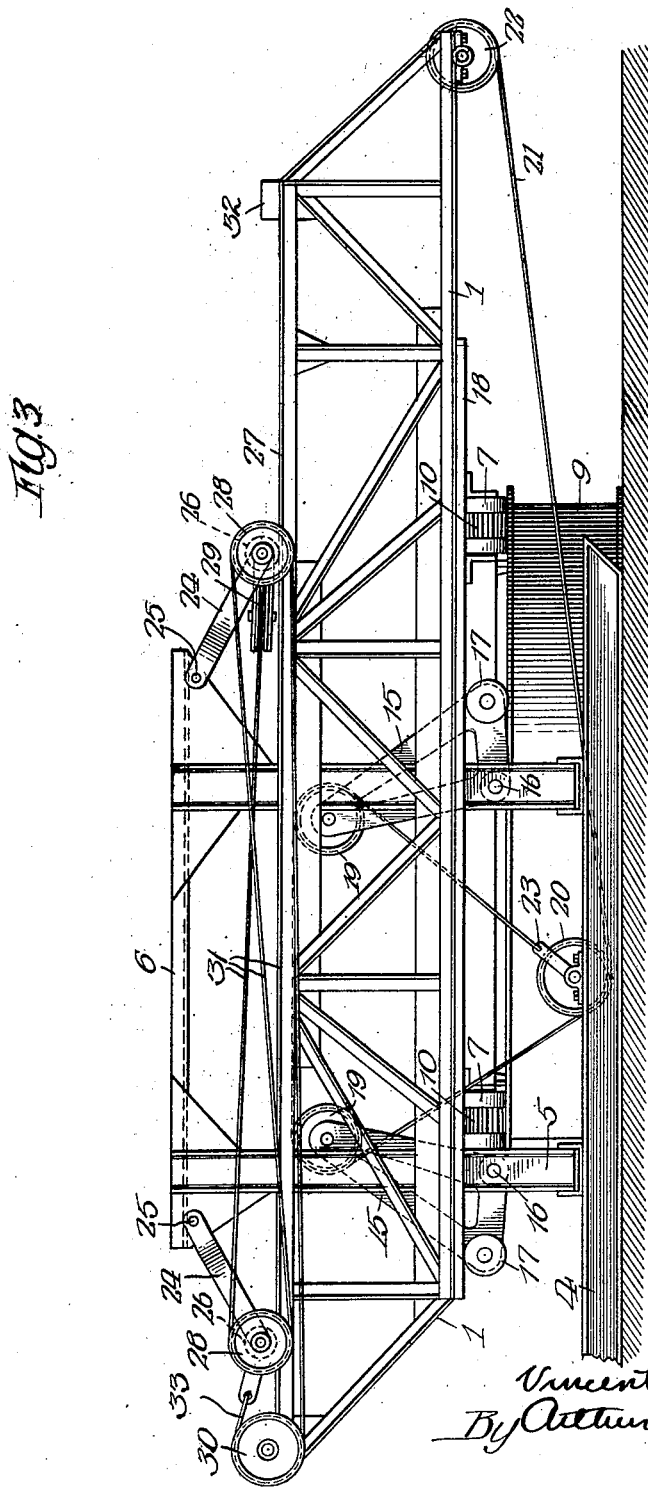

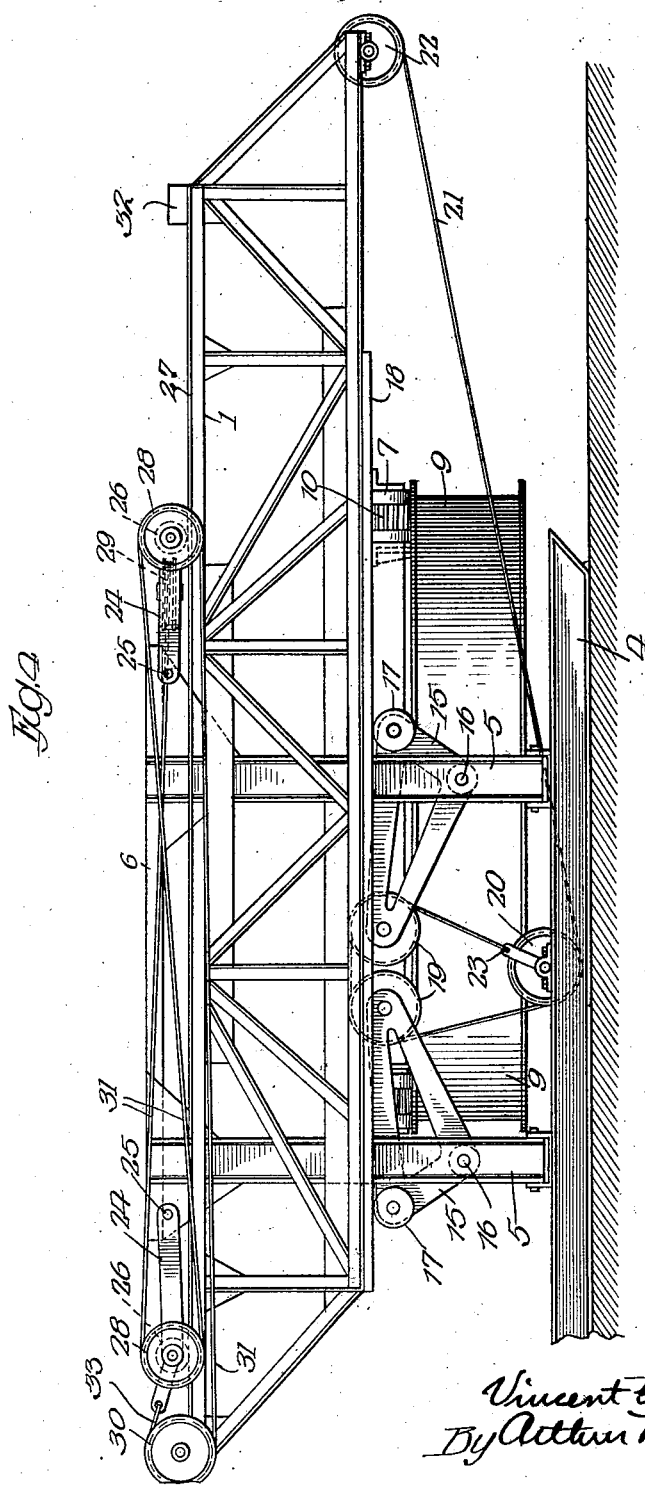

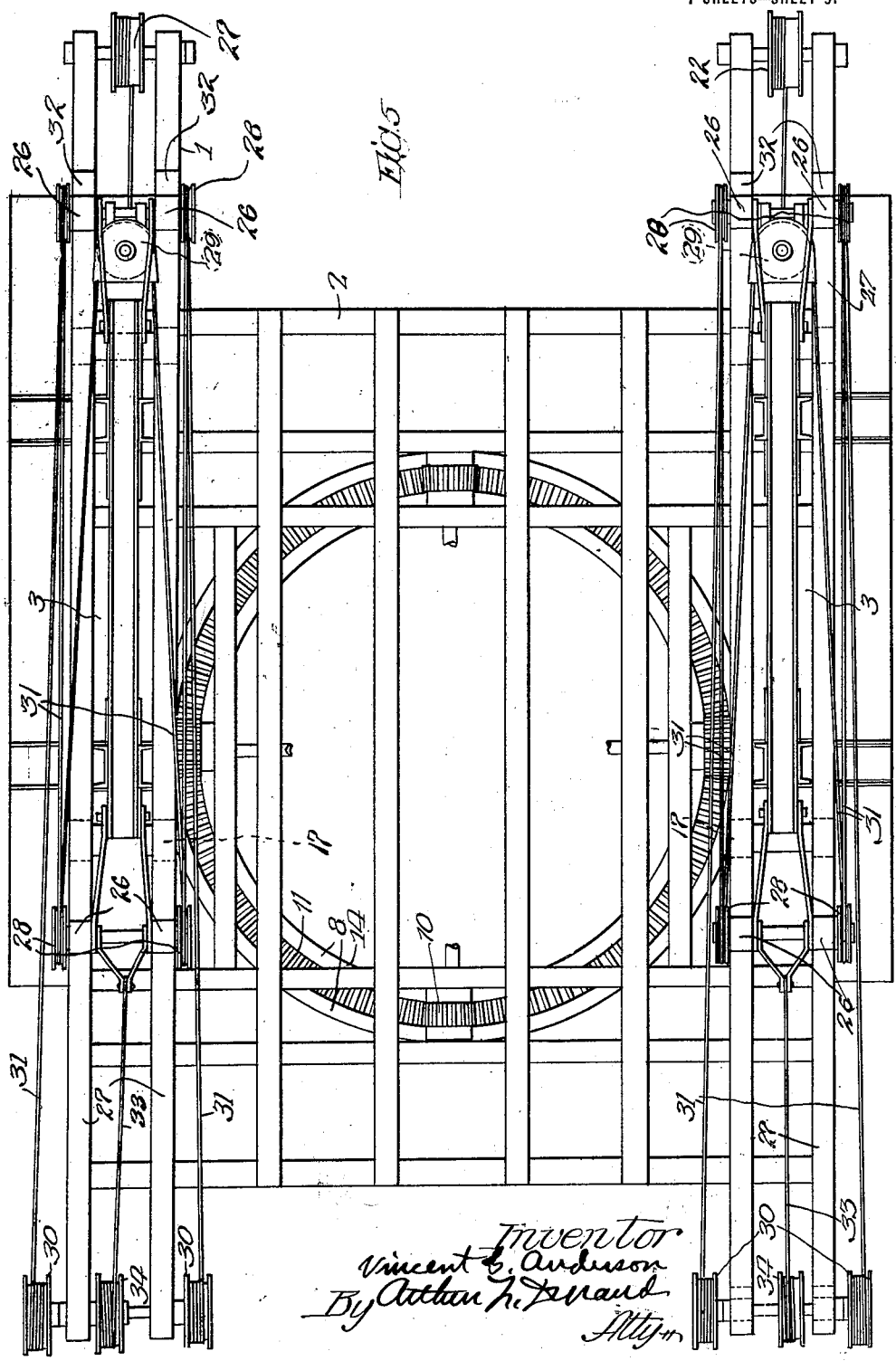

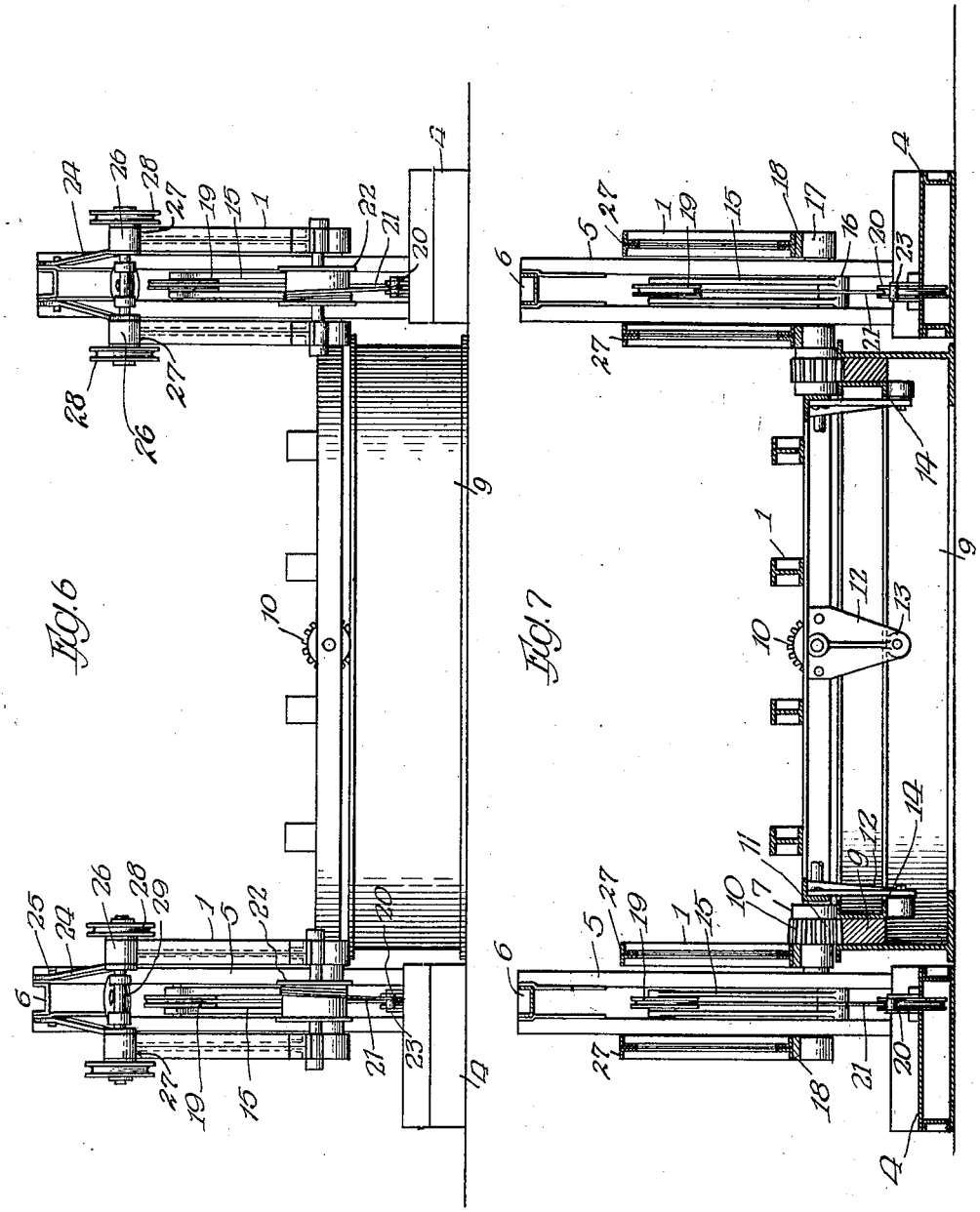

V. G. ANDERSON.
WALKING MOTION PROPELLING APPARATUS.
APPLICATION FILED APR. 22, 1918.
1,429,551.
Patented Sept. 19, 1922.
7 SHEETS—SHEET 7.
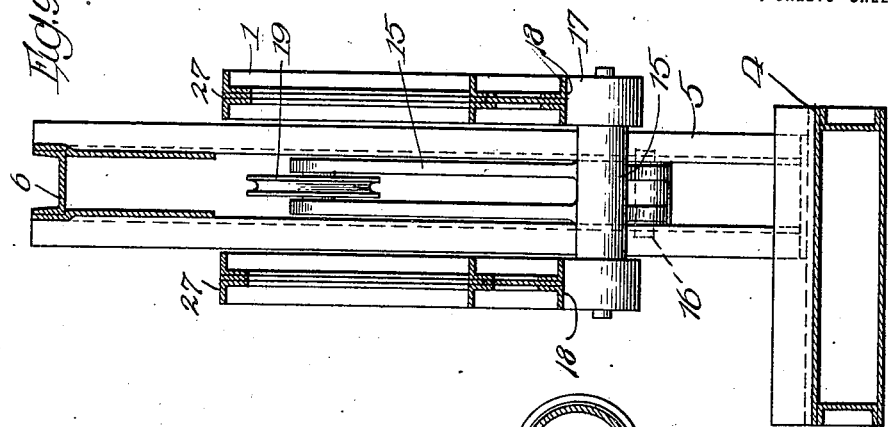
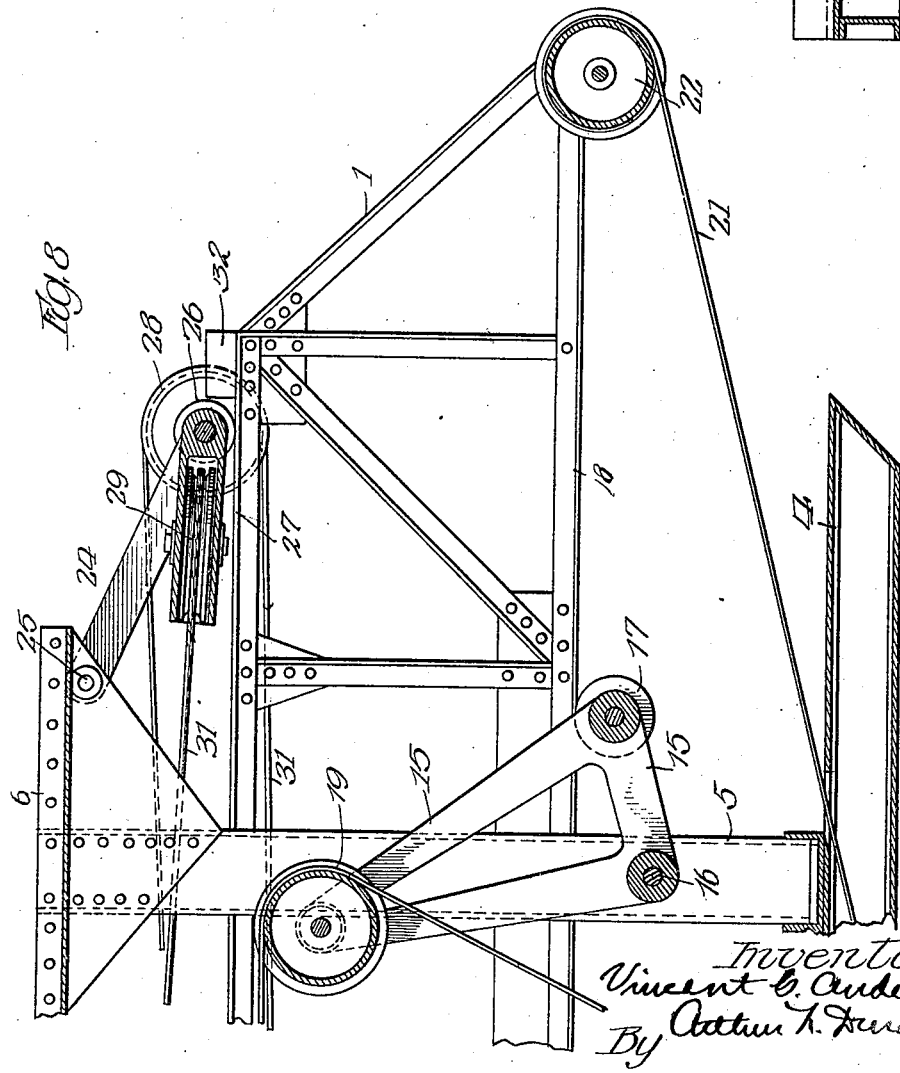

Patented Sept. 19, 1922.

1,429,551

UNITED STATES PATENT OFFICE.

VINCENT G. ANDERSON, OF KENOSHA, WISCONSIN, ASSIGNOR TO FREDERICK C. AUSTIN, OF CHICAGO, ILLINOIS.

WALKING-MOTION PROPELLING APPARATUS.

Application filed April 22, 1918. Serial No. 229,946.

*To all whom it may concern:*

Be it known that I, VINCENT G. ANDERSON, a citizen of the United States of America, and resident of Kenosha, Kenosha County, State of Wisconsin, have invented a certain new and useful Improvement in Walking-Motion Propelling Apparatus, of which the following is a specification.

This invention relates to propelling apparatus of that kind in which the structure as a whole is so constructed and operated that it has a walking motion, being constructed to move forward intermittently, the weight being first supported on the main frame or body and then on the auxiliary frame in a manner which is characteristic of apparatus of this kind.

Generally stated, the object of the invention is to provide a novel and improved apparatus of the foregoing general character.

A special object is to provide a novel and improved construction and arrangement for raising and lowering the main frame or body, so that it may be elevated and shifted forward and then lowered without teetering or tilting; to provide an improved construction and arrangement whereby the auxiliary frame may also be raised and moved forward and lowered without tilting, whereby neither frame will drag on the ground while moving forward; and to provide certain details and features of construction and combinations tending to increase the general efficiency and desirability of a propelling apparatus of this particular construction.

Apparatus of this kind can be used for various purposes, and may be employed, for example, for propelling a large and heavy excavator forward along the ground, such as an ordinary drag-line bucket excavator, but the invention is not limited to any particular use or purpose.

To the foregoing and other useful ends, the invention consists in matters hereinafter set forth and claimed, and shown in the accompanying drawings, in which:—

Figure 1 is a side elevation of a walking motion propelling apparatus embodying the principles of the invention, showing both the main frame and the auxiliary frame resting on the ground.

Figure 2 shown the auxiliary frame in raised position, and ready to be moved forward, being in position to complete its forward movement by the operation of the shifting mechanism.

Figure 3 shows the forward motion of the auxiliary frame completed, and shows this auxiliary frame lowered to the ground in its advanced position.

Figure 4 shows the main frame or body of the excavator in raised position, and ready to be shifted forward, being in position to complete its forward movement by the further operation of the shifting mechanism.

Figure 5 is a plan of the structure shown in said preceding views, the parts being in the positions shown in Figure 1.

Figure 6 is a rear end elevation of the structure as shown in Figure 1.

Figure 7 is a transverse vertical section on line 7—7 in Figure 1.

Figs. 8 and 9 are detail sectional views.

As thus illustrated, the invention comprises a main frame or body composed of trussed or otherwise stiffened side frames 1 suitably connected together by cross-members 2, so that the main frame thus constructed has a slot or longitudinal space 3 at each side thereof. The auxiliary frame comprises a pair of side frame sections each composed of a shoe 4 adapted to slide on the ground, uprights or risers 5 suitably mounted thereon, and longitudinal top members 6 to connect said risers together, each auxiliary frame section thus provided being adapted to have relative movement back and forth in the space or slot 3 at one side of the main frame. The main frame is provided at its lower side with rollers 7 adapted to travel on the circular tracks 8 of the turn-table 9, and with cogs or pinions 10 to engage the circular rack or cog-teeth 11 on the turn-table, there being a plurality of hangers 12 extending downward from said body and provided with rollers 13 to engage the underside of the circular track 14 of said turn-table, so that when the main frame or body is lifted the turn-table will also be lifted.

For lifting the main frame or body, mechanism is provided comprising bell-crank levers 15 which are pivoted at 16 on the uprights or risers 5, and which have rollers 17 to engage the tracks 18 on the underside of the side frames 1, the upper ends of said bell-cranks being provided with sheaves 19 of any suitable character. The shoes 4 are provided with sheaves 20, and a cable 21 extends from the drum 22 underneath the sheaves 20, then upward and over the sheaves 19, and then downward to the point 23 where the end of the cable is fastened adjacent the sheaves 20, whereby rotation of the drum 22 will tighten the cable 21 and draw the two bell-cranks 15 toward each other, thereby raising the main frame or body off the ground, (see Figure 4) and further rotation of the drum 22 will then cause the main frame or body to slide forward on the rollers 17 until it assumes a position suitable for the lowering of the turn-table onto the ground. This occurs without teetering or tilting on the part of the main frame, and thereafter, when the drums 22 (it being understood that this cable arrangement is duplicated at the other side of the structure) are rotated backward, the main frame will then be lowered until the turn-table rests on the ground, (see Figure 1) and it then becomes necessary to raise the auxiliary frame. With this arrangement, very obviously, the shoe 4 at one side of the machine can be operated while the shoe 4 at the other side stands still —that is to say, the shifting apparatus at one side is totally independent of the apparatus at the other side, and for certain purposes this independence of operation may be taken advantage of in shifting the machine around from one place to another, or in changing its direction of travel. By raising the main body frame at one side only, by independent operation of the apparatus at this side, the machine can be skewed around to change its direction of travel, or to shift it from one position to another.

The mechanism or devices for raising and lowering the auxiliary frame comprises toggle-arms 24 pivoted at 25 on the upper portions of the auxiliary frame sections, and provided at their lower ends with rollers 26 to engage the tracks 27 on the tops of the side frames 1, whereby movement of these two toggle-arms toward each other will lift the auxiliary frame sections off the ground. For this purpose, the lower ends of the toggle-arms 24 are provided with sheaves 28, which rotate about the axes of the rollers 26, and the rear toggle-arms 24 are also provided with sheaves 29 which are mounted to swing about the axes of the adjacent sheaves 28 and the adjacent rollers 26, being disposed in position to rotate about vertically disposed axes. Drums 30 are suitably mounted on the front end of the main frame or body, and cables 31 have their ends wound on these drums, and the cables are then arranged upon the sheaves 28 and 29 in such a manner that, when said drums are rotated, the toggle-arms 24 are pulled toward each other, in a very powerful manner, thus lifting the auxiliary frame sections and their shoes 4 from the ground. (See Figure 2.) Also, it will be seen, this operation, by the continued rotation of the drums 30, serves to pull the auxiliary frame forward until it occupies an advanced position. This forward motion continues until the rollers 26 of the rear toggle-arms 24 strike the stops 32 on the tracks 27, and then the drums 30 are rotated in the opposite direction to allow the toggle-arms 24 to move away from each other to lower the auxiliary frame sections to the ground. To facilitate this action, it being preferable to have the arms 24 moved toward each other a little past the center, so that their further movement toward each other is limited by the uprights 5, cables 33 are secured to the lower ends of the front toggle-arms 24 and then stretched forward and wound upon the drums 34 at the front end of the main frame or body. When the drums 30 rotate backward, the drums 34 rotate forward, and thus the cables 31 are loosened or allowed to become slack at the same time that the cables 33 are being tightened, so that the arms 24 are caused to move away from each other (see Figure 3), thus allowing the auxiliary frame sections to gradually settle until their shoes 4 rest upon the ground. It will be seen that these toggle-arms 24 move farther apart and practically assume horizontal positions when the previously described bell-cranks 15 are operated to raise the main frame or body (see Figure 4) and in this way the turn-table is raised from the ground.

It will be understood that the bottom of the turn-table 9 may be provided with shoes or any other means for supporting it on the ground, and that power-transmitting connections of any suitable character can be employed for operating the pinions 10 to turn the main frame or body about a vertical axis after the auxiliary frame is raised from the ground. In this way, the direction of travel of the excavator or other structure can be changed at will. In addition, any suitable means can be employed for transmitting power to the drums 22, and to the drums 30 and 34, for the purpose of operating these drums in the previously described manner. The power-plant for furnishing the power for these operations can be located, of course, on the main frame or body, and may be of any suitable form or character.

When the auxiliary frame sections are raised, it is obvious that the bell-cranks 15 must move away from each other, and this is accomplished by backward rotation of the drums 22, and these drums must continue to rotate backward in order to permit the auxiliary frame sections to move forward.

From the foregoing it will be seen that an effective arrangement is provided for alternately raising and lowering the main frame and the auxiliary frame, and for alternately shifting these frames forward, thereby to produce the walking motion characteristic of a propelling apparatus of this particular character. The main frame is supported in such a way that it does not tilt or teeter while moving forward, and this is also true of the auxiliary frame, and one object, therefore, is to avoid any dragging of either frame on the ground while it is moving forward. In this way, less power is required as each frame will move forward freely without any interference or retardation by contact with the ground.

It will be understood, of course, that the various winding drums can be of any suitable diameter, and that they can be relatively proportioned to wind up and pay out the different cables in the manner described, thereby to raise and lower the auxiliary frame, and to raise and lower the main frame, as explained. It will also be understood that, while some of the drums are shown on one and the same shaft, they can be mounted separately, if such is necessary or desirable, and operated in any suitable or required manner.

The walking motion propelling apparatus thus constructed and operated involves a main body frame which moves forward each time it is raised, and which remains at rest each time the auxiliary frames are moved forward, whereby the main frames or object to be moved has a forward movement, not each time the apparatus as a whole moves forward, but every other time a forward step is taken by the entire apparatus.

What I claim as my invention is:—

1. A walking motion propelling apparatus comprising a main frame, an auxiliary frame, means to lift the main frame and shift it forward on the auxiliary frame, and instrumentalities separate and distinct from said means and operating between the top of the main frame and the top of the auxiliary frame to lift the auxiliary frame and shift it forward.

2. A structure as specified in claim 1, said instrumentalities comprising toggle-arms pivoted on the auxiliary frame and provided with rollers adapted to engage the main frame, and cables and sheaves arranged to cooperate to pull said toggle-arms toward each other to lift the auxiliary frame while the main frame is resting on the ground.

3. A structure as specified in claim 1, said instrumentalities comprising toggle devices, and cables and sheaves arranged to cooperate to operate said toggle devices.

4. A structure as specified in claim 1, said means for lifting the main frame comprising bell-cranks provided with rollers for engaging the lower edges of the main frame, cables and sheaves arranged to cooperate to operate said bell-cranks, and drums at the rear end of the main frame to operate said cables.

5. A structure as specified in claim 1, and means to limit the forward shifting motion of the auxiliary frame, in combination with means to then control said instrumentalities to insure the lowering of the auxiliary frame.

6. In a walking motion propelling apparatus, the combination of a main frame and an auxiliary frame, toggle-arms (24) pivoted on the auxiliary frame, rollers (26) on the lower ends of said toggle-arms, sheaves (28) on the free ends of said toggle-arms, sheaves (29) connected to the lower ends of the rear toggle-arms, cables (31) arranged around said sheaves, and drums to operate said cables, there being one of said cables for each side of the structure.

7. In a walking motion propelling apparatus, the combination of a main frame, an auxiliary frame movable up and down and forward at each side of said main frame, operating apparatus associated with each auxiliary frame, whereby the main frame and auxiliary frames are alternately raised and lowered, and so that the main frame and the two auxiliary frames may be alternately shifted forward, the apparatus at one side being operable independently of the apparatus at the other side, and said main and auxiliary frames being also independently operable.

8. A structure as specified in claim 7, each apparatus having front and rear winding drums for the operation respectively of the auxiliary and main frames.

9. The improved walking motion propelling apparatus, having shifting apparatus at one side, and shifting apparatus at the other side, each apparatus being movable up and down and operable independently of the other, and a main support independently supporting the load on the ground alternately with respect to one or both of said shifting structures.

10. In a walking motion propelling apparatus, the combination of a main body frame, shifting apparatus at one side of said body frame, shifting apparatus at the other side of said body frame, thereby to raise and shift the body frame forward, and means to support the body frame on the ground, each apparatus being movable up and down and operable independently of the other, whereby each alternately rests upon the ground and supports the load.

11. A structure as specified in claim 10, said shifting apparatus comprising pivoted members having rollers to engage the under side of the main frame, so that the main frame can slide forward when raised, cables for operating said members to raise and shift the main frame forward, links pivoted on said apparatus, rolls on said links to engage the top of said main frame, and cables to operate said links to raise and shift the apparatus forward.

12. A structure as specified in claim 7, in combination with a turntable to support the main frame on the ground and whereby the two independently operated auxiliary frames may be swung about a vertical axis when raised.

13. A structure as specified in claim 9, said apparatus comprising cables and means cooperating therewith to raise and shift each apparatus forward.

14. A walking motion propelling apparatus comprising a main body frame, a turntable moved by and supporting said body frame, which is rotatable thereon, and whereby a change in direction of movement of said apparatus may be accomplished, a pair of independently operated auxiliary frames, and independent cable-controlled means for raising, advancing and lowering said main body frame and said auxiliary frames alternately, thereby advancing the load upon alternate steps of the apparatus.

15. A walking motion propelling apparatus comprising a main body frame, a pair of auxiliary frames, a turntable supporting and moved by said main body frame, said frames being alternately operable and the load being advanced only upon advance of the body frame, and means comprising independent cables, operating means cooperating therewith and movable supporting members for advancing each of said frames.

16. A walking motion propelling apparatus, comprising a main supporting frame, an auxiliary supporting frame, means to lift the main frame and shift it forward while the apparatus is supported by said auxiliary frame, and separate means for lifting the auxiliary frame and advancing it while the main frame stationarily supports the load upon the ground, said frames forming independent supports alternately resting upon the ground and supporting the entire load, and the load being advanced only upon the forward motion of said main frame or at every other step of the apparatus.

Signed by me at Chicago, Cook County, Illinois, this 23rd day of March, 1918.

VINCENT G. ANDERSON.